US010048661B2

(12) United States Patent
Arthur et al.

(10) Patent No.: US 10,048,661 B2
(45) Date of Patent: Aug. 14, 2018

(54) VISUALIZATION OF ADDITIVE MANUFACTURING PROCESS DATA

(71) Applicant: General Electric Company, Schenectady, NY (US)

(72) Inventors: Richard Brownell Arthur, Niskayuna, NY (US); Mark Allen Cheverton, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 711 days.

(21) Appl. No.: 14/573,869

(22) Filed: Dec. 17, 2014

(65) Prior Publication Data
US 2016/0179064 A1  Jun. 23, 2016

(51) Int. Cl.
| | | |
|---|---|---|
| G06F 17/00 | (2006.01) |
| G06T 1/00 | (2006.01) |
| G05B 15/02 | (2006.01) |
| B33Y 50/02 | (2015.01) |
| B29C 67/00 | (2017.01) |
| G05B 19/401 | (2006.01) |

(52) U.S. Cl.
CPC .......... *G05B 15/02* (2013.01); *B29C 67/0088* (2013.01); *B33Y 50/02* (2014.12); *G05B 19/401* (2013.01); *G05B 2219/49018* (2013.01); *Y02P 90/265* (2015.11)

(58) Field of Classification Search
CPC ..... G06F 17/50; G06T 19/00; A61C 13/0004; G05B 19/4097; G05B 19/4099
See application file for complete search history.

(56) References Cited

U.S. PATENT DOCUMENTS

| | | | |
|---|---|---|---|
| 6,782,303 B1 | 8/2004 | Fong | |
| 6,813,533 B1 | 11/2004 | Semak | |
| 8,747,097 B2 | 6/2014 | Pettis | |
| 2009/0152771 A1* | 6/2009 | Philippi | B29C 67/0077 264/410 |
| 2010/0174392 A1 | 7/2010 | Fink et al. | |
| 2010/0302241 A1* | 12/2010 | Reuveni | G06F 17/50 345/420 |
| 2013/0310961 A1* | 11/2013 | Intriago Velez | B29C 67/0051 700/97 |
| 2014/0074274 A1 | 3/2014 | Douglas et al. | |
| 2014/0163717 A1 | 6/2014 | Das et al. | |

(Continued)

FOREIGN PATENT DOCUMENTS

WO  2014/106753 A1  7/2014

*Primary Examiner* — Martin Mushambo
(74) *Attorney, Agent, or Firm* — GE Global Patent Operation; John Darling (57) ABSTRACT

Systems, apparatus and methods provide a visual representation to users of data collected from a three dimensional manufacturing process, such as an additive manufacturing (AM) process. In an embodiment, a user device receives process data associated with a three dimensional manufacturing process, transforms the process data into visualization data compatible with a computer-aided design specification, receives a Boolean query, and then renders, in response to the Boolean query, a visual depiction on a display screen of at least one aspect of the three dimensional manufacturing process and/or the three dimensional manufacturing apparatus and/or a object being manufactured.

17 Claims, 4 Drawing Sheets

(56) References Cited

U.S. PATENT DOCUMENTS

2015/0044627 A1* 2/2015 German .................. A61C 7/08
433/24
2015/0045928 A1* 2/2015 Perez ................. B29C 67/0088
700/110

* cited by examiner

VISUALIZATION OF ADDITIVE MANUFACTURING PROCESS DATA

FIELD OF THE INVENTION

The present invention generally relates to systems, apparatus and methods that provide a visual representation of data collected from a three dimensional manufacturing process, such as an additive manufacturing (AM) process, to users. In some embodiments, data from an AM process, such as a powder bed direct metal laser melting (DMLM) process, a selective laser sintering (SLS) process, or a stereolithography (SLA) process, and the like, is collected, processed, and then displayed in a manner controlled by a user to provide visual information that can be utilized by the user to better understand potential object defects, the AM process, and/or the particular AM apparatus.

BACKGROUND

Additive Manufacturing (AM) is a process utilized to fabricate functional, complex objects without the use of molds or dies. Such processes include providing a material, such as a metal or plastic, in the form of a powder or a wire, and then using a powerful heat source (such as a laser beam, an electron beam, plasma welding arc, or the like) to melt and deposit a layer of that material on a substrate, such as a base plate of a work piece, or deposit the material on an existing object or part. Subsequent layers are then built up upon each preceding layer to form the complex object or part or work piece.

AM technologies may be thought of as a 'tool-less' and digital approach to manufacturing which provides companies and consumers with a wide and expanding range of technical, economic and social benefits. For example, AM technologies can be used anywhere in a product life cycle from pre-production prototypes to full scale production, as well as for tooling applications or post production repair and are stimulating innovation in component design to enable the manufacture of objects that cannot be made by traditional methods. The layer-wise nature of AM enables the manufacture of highly complex shapes with very few geometric limitations compared to traditional manufacturing processes. This freedom-of-design has led to the technology being used to manufacture topologically optimized shapes with improved strength to weight ratios for example, which is an important consideration in both the aerospace and automotive design fields to reduce vehicle weight and fuel consumption.

Selective Laser Sintering (SLS) is an example of an additive manufacturing technique. SLS utilizes a laser (for example, a carbon dioxide laser) to fuse small particles of plastic, metal, ceramic, or glass powders into a mass that has a desired three-dimensional shape. The laser selectively fuses powdered material by scanning cross-sections generated from a three-dimensional (3-D) digital description of the object (for example from a computer-aided design (CAD) file or scan data file) on the surface of a powder bed. After each cross-section is scanned, the powder bed is lowered by one layer thickness (which is typically very thin), a new layer of material is applied on top, and the process is repeated until the object is completed. With the advent of high-power lasers (in the range of 100's to 1000 Watts or higher), Direct Metal Laser Melting (DMLM) is typically utilized to completely melt metal particles during 3-D manufacturing of work pieces.

Finished object or part density depends on peak laser power, scan speed, beam size, beam focus, beam overlap and/or other aspects, but the key to getting high density parts is the energy density being delivered to the melt pool. As the melting point of metal powders is very high, a DMLM machine typically uses a high power laser that could be pulsed or continuous wave (CW). In some implementations, an electron beam metal powder bed machine (EB) DMLM preheats the bulk powder material in the powder bed to a temperature somewhat below its melting point, to make it easier for the laser to raise the temperature of the selected regions of the powder material the rest of the way to its melting point. Unlike some other additive manufacturing processes, such as stereolithography (SLA) and fused deposition modeling (FDM), DMLM does not necessarily require support structures because the object being constructed is surrounded by unsintered powder at all times, allowing for the construction of previously impossible geometries. However, some three-dimensional structures that include long overhangs or unsupported roofs require supports in order to print an accurate geometry and the desired surface finish. These support structures have two purposes. First, they offer physical support to an unsupported layer and keep it attached to neighboring structures, and second, the support structure gives a thermal pathway for the heat that is developed in the melt pool during the welding of an unsupported structure. With the powder acting as a thermal insulator in the DMLM process, it is necessary to try to control the thermal conductivity in the subsurface structure in order to keep the melt pool constant. When the melt pool overheats, it can become larger and affect both the feature resolution and surface finish of the object, especially on the downward facing unsupported surfaces. DMLM (as well as other AM techniques) is a relatively new technology that so far has mainly been used for rapid prototyping and for low-volume production of component parts. However, production roles are expanding as the commercialization of such AM technologies improves.

Therefore, it would be desirable to provide systems, apparatus and methods to help users, such as engineers and/or part or object designers, visualize the data collected from an AM process so that a better understanding can be obtained concerning the object being made, the effectiveness of the support structures being used, the consistency of the melt pool, and/or any potential object defects and/or the manufacturing process itself and/or the AM machine that is performing the manufacturing process.

BRIEF DESCRIPTION

Presented are systems, apparatus and methods that provide a visual representation to users of data collected from a three dimensional manufacturing process, such as an additive manufacturing (AM) process. In accordance with some embodiments, a visualization method includes a user device receiving process data associated with a three dimensional manufacturing process and transforming the process data into visualization data compatible with a computer-aided design specification. The process also includes the user device receiving a Boolean query that is associated with at least one aspect of at least one of the manufacturing process, a portion of a object, and a three dimensional manufacturing apparatus, and then rendering a visual depiction of the at least one aspect on a display screen in response to the Boolean query.

Other embodiments are associated with systems and/or computer-readable medium storing instructions to perform any of the methods described herein.

BRIEF DESCRIPTION OF THE DRAWINGS

Features and advantages of some embodiments, and the manner in which the same are accomplished, will become more readily apparent upon consideration of the following detailed description taken in conjunction with the accompanying drawings, which illustrate exemplary embodiments and which are not necessarily drawn to scale, wherein.

DETAILED DESCRIPTION

Described herein are systems, devices and methods for providing a visual representation of the data collected from an additive manufacturing (AM) process to users. In some embodiments, data from an AM process, such as a weld laser process, a polymer solidification process, and the like, is collected, processed, and then displayed in a manner controlled by a user to provide visual information that can be utilized by the user to better understand and/or prevent potential work piece defects, improve AM machine processing, and/or improve the particular AM process with regard to the work piece being fabricated.

It should be understood that, while the exemplary embodiments described herein emphasize fabrication techniques using a laser and melt pool process, the disclosed principles may be adapted to a wide variety of three-dimensional fabrication processes, for example, additive fabrication processes that include, but are not limited to, selective laser sintering, fused deposition modeling, stereolithography (SLA), Direct Metal/Material Deposition (DMD) based SLA, and three-dimensional printing. It should also be understood that the novel data visualization tool, although valuable for interpreting data from new processes such as AM, could also be used to provide visualization data for conventional machining processes used to make three-dimensional (3D) objects, for example, when utilizing Computer Numerical Control (CNC). All such variations that can be adapted for use with a network as described herein are intended to fall within the scope of this disclosure. Moreover, any reference herein to a fabrication process such as an AM process, a printing process, and/or a three-dimensional (3D) printing process is intended to refer to any and all such additive fabrication processes unless a different meaning is explicitly stated or otherwise clear from the context. Thus by way of example and not of limitation, an AM apparatus that includes a laser heat source, electron beam source, ultrasonic energy source, and/or the like is now described that may be used in a networked three-dimensional manufacturing environment.

The embodiments disclosed herein are set forth to aid in an understanding of the subject matter of this disclosure, but are not intended to, and should not be construed to limit in any way the claims appended hereto. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1A:
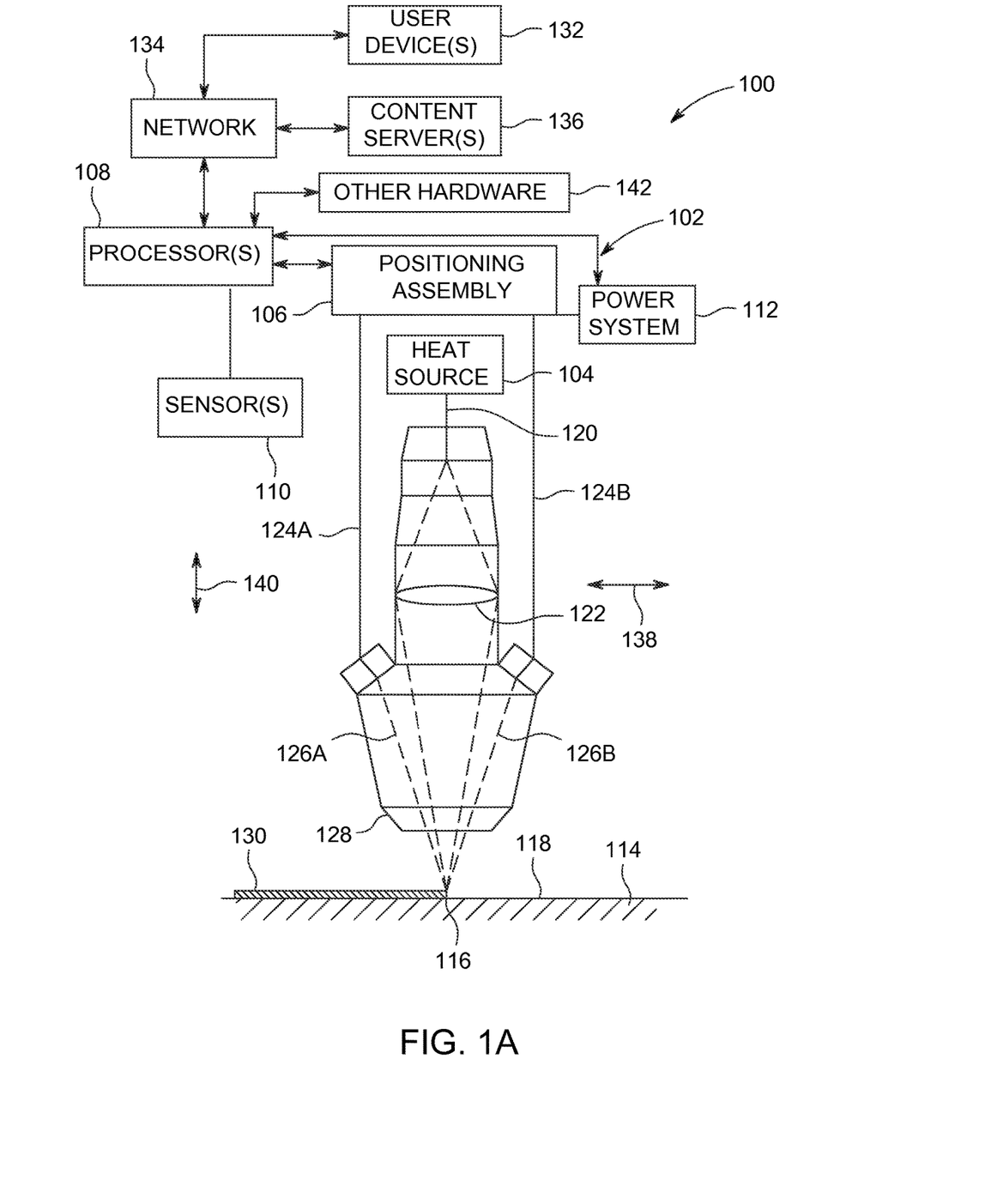
FIG. 1A is a schematic block diagram of an example of an additive layer manufacturing apparatus that delivers powder to a melt pool in accordance with some embodiments.

FIG. 1A is a schematic block diagram (not drawn to scale) of an additive layer manufacturing (AM) system 100 for conducting a three-dimensional (3D) manufacturing process, for generating AM visualization data, and for displaying AM visualization data to a user in accordance with some embodiments. An AM apparatus 102 includes a heat source 104 (which in some embodiments is a high-powered laser), a positioning assembly 106, one or more processors 108, one or more sensors 110, a metallic powder material delivery system 112, and a substrate 114 (which may be a powder bed). The AM apparatus 102 may also include a cooling apparatus (not shown), which may be in the form of a forced cooling nozzle.

The heat source 104 may be any appropriate type of laser, for example, an Nd:YAG laser, and is shown focused on a focal point 116 on an upper surface 118 of the powder bed 114. The processor 108 controls the laser 104 to deliver a laser beam via an optical fiber 120 to an optical element 122 (which may include one or more lenses) that focuses the laser beam which melts the upper surface 118 to form a weld pool at the focal point 116. The processor 108 may also be configured to control the powder system 112, which includes upper delivery lines 124A and 124B and lower delivery lines 126A and 126B that may be disposed symmetrically around a deposition nozzle 128. The delivery lines 124A, 124B, 126A, 126B enable the deposition nozzle 128 to deliver powder to the vicinity of the laser focal point 116. In operation, the powder is fully melted by the laser beam as it is deposited on the work piece surface 118 to form a layer or bead 130. In some embodiments, the bead 130 is cooled to a crystallized state by using a forced cooling gas nozzle (not shown) that utilizes air or a cryogenic spray jet. Many beads may be laid down beside one another and/or on top of each other (layers) to form a particular work piece as desired by a user. In some implementations, the powder is a titanium powder, but it should be understood that other types of materials can be used, such as stainless steel powder or the like.

In some embodiments, the positioning assembly 106 (which may include one or more motors (not shown), such as stepper motors) is operable to move the AM apparatus 102 (including the nozzle 128) under the control of the processor 108 in the X-Y plane (which is parallel to the surface 118) and vertically in the Z direction (which is perpendicular to the surface 118). Thus, the laser focal point 116 may be directed to any point in a working envelope in the X-Y plane (horizontally) and along the Z-axis (vertically) to therefore accommodate work pieces of different heights and widths, and also regions of different heights within particular work pieces. Accordingly, since the AM apparatus 102 can move in a traverse direction, in the direction of the arrow 138, as well as in the vertical direction, in the direction of arrow 140, it is a three-axis additive layer manufacturing machine. However, in some embodiments, the AM apparatus may encompass a different type of machine having fewer or greater axis of control.

In some embodiments, a user operates a user device 132, which may be a mobile device, to interact with a network 134 and with content servers 136 to select a work piece design and to control the AM device 102 by transmitting instructions from the user device to the processor 108. Examples of a suitable user device 132 include, but are not limited to, a laptop computer, a tablet computer, a thin client network computer, a portable digital assistant (PDA), a messaging device, a cellular telephone, a Smartphone, and a portable media or entertainment device (such as a digital music player). In general, the user device 132 may be operated by users for a variety of user-oriented functions such as to locate 3D objects or 3D work pieces in one or more of the content servers 136 for manufacture, to submit 3D work piece instructions to the processor 108 for AM manufacturing, to monitor the progress of fabrication of a 3D work piece, and the like. For example, a user may select a 3D work piece design for fabrication from the content server 136 via the network 134, and then operate to submit fabrication instructions associated with a model of that 3D work piece to the processor 108. Once 3D fabrication instructions are received, the processor 108 operates to control the components of the AM apparatus 102, including the positioning assembly 106 and the powder delivery system 112, to begin fabrication of the selected work piece. The processor 108 may include any combination of software and/or processing circuitry suitable for controlling the various components of the AM apparatus 102 described herein including without limitation microprocessors, microcontrollers, application-specific integrated circuits, programmable gate arrays, and any other digital and/or analog components, as well as combinations of the foregoing, along with inputs and outputs for receiving and/or transmitting control signals, drive signals, power signals, sensor signals, and the like. In some embodiments, the processor 108 includes processing circuitry with sufficient computational power to provide related functions such as executing an operating system, providing a graphical user interface (for example, to a display (not shown) coupled to the processor 108), convert three-dimensional (3D) models into 3D work piece fabrication instructions, and host remote users and/or activity through the network 134. In some implementations, as the work piece is being fabricated, the processor 108 receives sensor data concerning the fabrication of the 3D work piece and/or the AM apparatus from one or more sensors 110.

As mentioned above, the processor 108 is operably connected to one or more sensors 110 which function to obtain data concerning various characteristics and/or aspects associated with the operation of the AM apparatus 102. The positioning and/or the mechanical connections and/or electrical interconnections between the one or more sensors 110 and other components of the AM apparatus 102 may depend upon the type and purpose of the sensors 110 and will be readily understood and appreciated by those of skill in the art. For example, the one or more sensors 110 may include a temperature sensor positioned to sense a temperature of the surface 118 or the bead 130, which may include a thermistor or the like embedded within or attached below the surface 118 of the substrate 114. This may also include (or instead include) sensors such as an infrared detector or the like directed at the surface 118, and/or a heat sensor, a volume flow rate sensor, a weight sensor, a sound sensor, and a light sensor. Accordingly, the one or more sensors 110 may be positioned and/or configured to detect parameters of the AM apparatus 102 such as laser power, laser drive current, laser scan speed, x-y-z coordinates, laser scatter off galvanometer window, extrusion temperature, vibration data, re-coater vibration, machining tool vibration, feed speed, wire delivery speed, powder delivery speed, build chamber temperature, gas flow, oxygen concentration, spindle speed, accelerometer data, curing lamp intensity and the like features or parameters. In addition, the one or more sensors 110 may include one or more sensors to detect a presence (or absence) of the work piece, such as an optical detector and/or an imaging device and image processing circuitry to capture an image of the work piece during fabrication. On or more sensors may also be positioned and/or configured to provide macroscopic object data, such as camera images of the object being built, thermal images of the object, images of the powder bed layer, images of the post-weld layer, spatter quantification and the like. Moreover, one or more sensors may be positioned and/or configured to capture microscopic object data, such as bead quality, melt pool size, melt pool shape, melt pool temperature, melt pool image, melt pool emission intensity, thermal melt pool data and/or thermal melt pool images. The feedback provided from the one or more sensors 110 may be input to the processor 108, which may then generate instructions, for example, to interrupt fabrication processing or otherwise control operation of the AM apparatus 102. The one or more sensors 110 may also (or instead) include at least one video camera to capture images of the work piece or any other hardware associated with the AM apparatus 102. The video camera may provide a remote video feed through the network 134 to the user device 132 via a user interface (not shown). Thus, in some embodiments, a user interface is provided that presents a video feed from at least one video camera of a three-dimensional work piece during fabrication to a remote user by display on a display screen (not shown) of the user's device 132.

The one or more sensors 110 may also include more complex sensing and processing systems or subsystems, such as a three-dimensional scanner using optical techniques (such as stereoscopic imaging, or shape from motion imaging), structured light techniques, or any other suitable sensing and processing hardware capable of extracting three-dimensional data or other information from a work piece. In another aspect, the one or more sensors 110 may include a machine vision system (not shown) that captures images and/or analyzes image content to obtain information about the status of a fabrication job or process, and/or the status of the powder delivery system 112, and/or the status of the work piece. Such a machine vision system may support a variety of imaging-based automatic inspection, process control, and/or AM machine guidance functions including, but not limited to, pass/fail decisions, error detection (and corresponding audible or visual alerts), work piece shape detection, work piece and/or nozzle position detection, AM apparatus orientation detection, and the like.

It should also be understood that other components, generically depicted as other hardware 142, may also be included and may be operably connected to the processor 108. The other hardware 142 may include, for example, input devices such as a keyboard, a touchpad, a mouse, one or more switches, dials, buttons, and/or motion sensors, and the like, as well as output devices, such as a display, a speaker or other audio device, one or more visual indicators, and the like. Some or the input devices may be utilized, for example, by an operator and/or engineer and/or user to input visual observations that can be utilized to provide visualization data. The other hardware 142 may also include a variety of cable connections and/or hardware adapters and/or or wireless communication devices for operably connecting to other analog or digital devices such as external computers, external hardware, external instrumentation and/or data acquisition systems, and the like. In addition, it should be understood that the various blocks or modules shown in FIG. 1A may represent any number of processors, computers and/or computer systems configured for processing and/or communicating information via any type of communication network, and communications may be in a secured or unsecured manner. In some embodiments, however, the modules depicted in FIG. 1A are software modules operating on one or more computers. In some embodiments, control of the input, execution and outputs of some or all of the modules may be via a user interface module (not shown) which includes a thin or thick client application in addition to, or instead of a web browser. Furthermore, as used herein, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, entire modules, or portions thereof, may also be implemented in programmable hardware devices such as field programmable gate arrays, programmable array logic, programmable logic devices or the like or as hardwired integrated circuits.

Figure 1B:
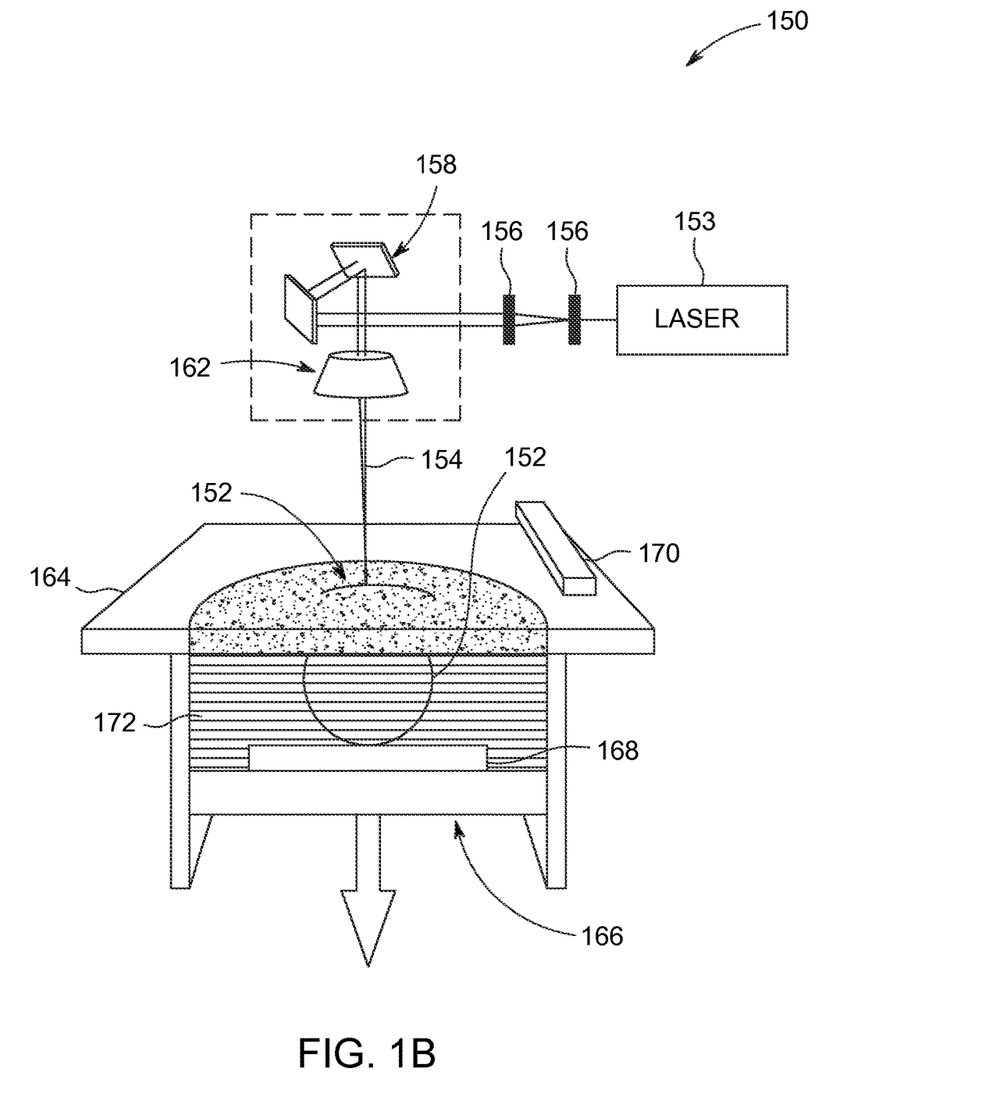
FIG. 1B is a schematic diagram of an example of a powder bed system in accordance with some embodiments.

FIG. 1B is a schematic diagram of an example of a powder bed system 150 in accordance with some embodiments. In particular, the powder bed system 150 is used to manufacture an object 152 by powder bed Direct Metal Laser Melting (DMLM). A laser 153 produces a high power laser beam 154 that is focused through a series of optics 156 and directed onto mirrors 158 mounted on high speed scanning galvanometers (not shown), which enables the laser beam to be scanned over the powder bed 160, with focus being maintained through a F-theta lens 162. A powder layer, which may be a titanium-type powder, is distributed evenly over a flat substrate plate 164 which is securely fastened to a build platform 166 or piston. The laser and build facilities are enclosed in a chamber (not shown), and in some implementations the oxygen level in the build chamber is reduced by purging with argon until the level falls below 0.2%. A uniform layer of powder is deposited on the build substrate 168 by a wiper and powder deposition mechanism 170. The laser is then scanned over the powder to melt and fuse the powder together to form an object or part 152 while the build platform 166 or piston moves down by the chosen layer thickness. Thus the top portion of the object 152 is in a molten state as it is being fabricated, whereas the portion below the powder bed 160 is solidified. This process of powder deposition and laser exposure is repeated until the components of one or more objects are completed. Un-fused powder is then removed from around the objects on the build plate and the assembly is removed from the build chamber. The metal powder 172 to be melted is defined by the 3D model of the desired object or part. One or more sensors (not shown), may be utilized as explained above with regard to FIG. 1A, to monitor a DMLM fabrication process and provide process data that can be utilized to generate visualization data for a user as described herein.

Figure 2:
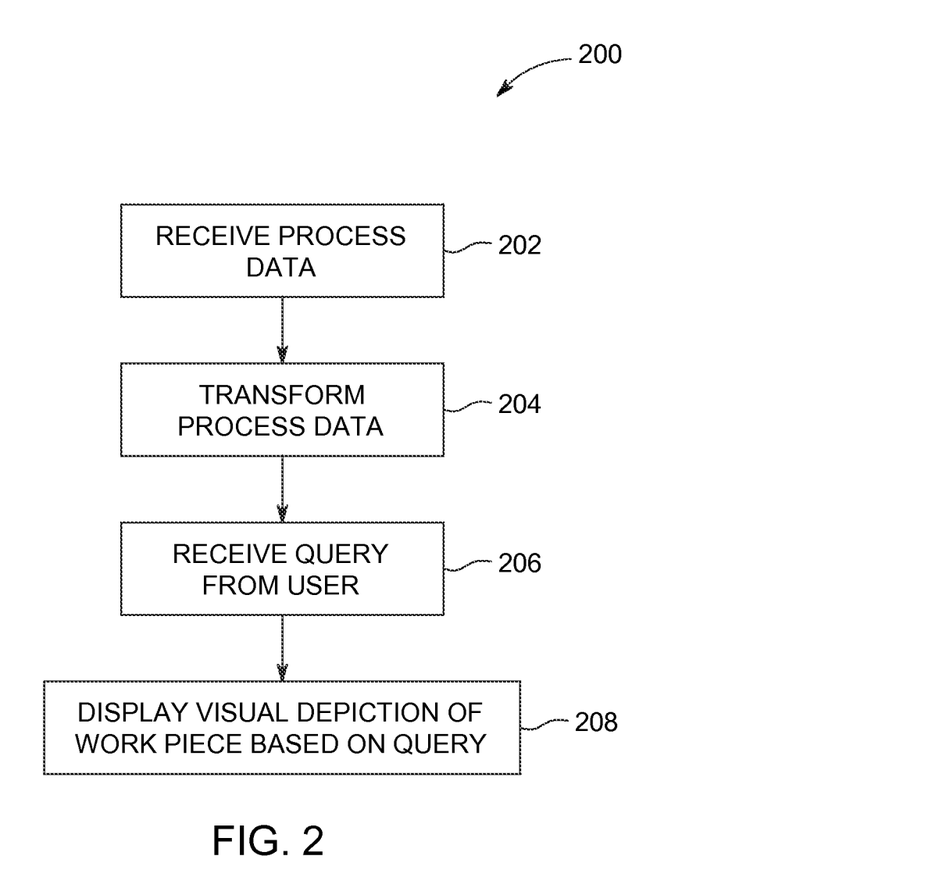
FIG. 2 is a flow chart of a visualization method associated with a manufacturing process such as an additive layer manufacturing (AM) process in accordance with some embodiments.

FIG. 2 is a flow chart of a visualization method 200 associated with a manufacturing process such as an additive layer manufacturing (AM) process in accordance with some embodiments. The method includes a user device (such as a tablet computer) receiving 202 process data, such as additive manufacturing (AM) process data, that may be provided by one or more sensors that are monitoring the manufacture of a work piece and/or monitoring the operation of one or more portions of the fabrication machine (such as the AM apparatus shown in FIG. 1A or the AM apparatus shown in FIG. 1B). Thus, it should be understood that the process data could be associated with many different types of fabrication processes and/or fabrication machines. Examples of fabrication processes include, but not limited to, a conventional machining process, a powder fed additive process, and/or a powder bed additive process. The operation of different types of fabrication apparatus may also be monitored, and such apparatus may fabricate objects by using metal, plastic, ceramics or composite materials. For example, process data may be generated by a lathe turning down a piece of metal to form a 3D object, or may be generated by an end mill, or may be generated by a laser forming system. Process data may also be provided, for example, by an operator who is observing a machining process (such as an AM process) and/or observing the work piece or object being fabricated.

The received process data associated with the work piece may include three-dimensional coordinate data (X-coordinate, Y-coordinate, and layer number), voltage data, and/or photon count data relating to a melt pool size. Other process data may also be included, such as melt pool size, melt pool shape, melt pool temperature, melt pool temperature distribution, an extrusion temperature, the x-y-z position, accelerometer data, vibration frequency data, laser drive current data, laser power data, machine current draw data, tool vibration data, object vibration data, wiper vibration data, curing lamp intensity data, surface roughness data, image pixel intensity data, acoustic signature data, spectrum from melt pool data, spectrum from plasma data, and/or subsurface heating data. The melt pool temperature data may be generated by, for example, a pyrometer, an IR camera, an imaging pyrometer, and/or spectrometers, whereas the melt pool size may be generated by, for example, a visible light camera, IR camera, photo diode, photo multiplier tube, avalanche photo diode, line scan camera, linear photodiode array. In addition, melt pool protrusion data may be generated by high resolution cameras, structure light imaging systems, stereoscopic imaging, and/or accelerometers. Weld bead quality data may be generated by high magnification imaging systems, and/or acoustic sensors, whereas weld accuracy data may be generated by high resolution imaging systems. Moreover, laser power data may be generated by, for example, optical power meters and/or back facet photo-diodes.

Referring again to FIG. 2, the user device is configured to transform 204 the received process data associated with an AM process and/or the work piece and/or the AM apparatus into data compatible with a computer-aided design (CAD) specification. For example, the user device may be configured to normalize received three-dimensional coordinate data so as to be compatible with a computer-aided design (CAD) software program. In a particular example, the three-dimensional coordinate data may be normalized to an appropriate scale to map to the X, Y and Z coordinate data required for use by the particular computer-aided design (CAD) software program running on the user device, such that one or more images corresponding to one or more portions of the work piece can be rendered on a display screen of the user's device.

Next, the process 200 includes the user device receiving 206 a query from a user that is associated with the AM process, for example, a query that is associated with a portion of the work piece. For example, a user may desire to see an image of the work piece where the pixel values in the image correspond to melt pool temperature for the purposes of learning more about one or more characteristics of the work piece and/or the AM process and/or the AM apparatus. It may also be of interest to compare different sensor values and have their Boolean relationships displayed as a portion of the image on a display screen of a user's device. For example, the user may generate a Boolean query so that the results shown in a displayed image has pixel values that correspond to instances where the melt pool temperature is within a selected or certain range and wherein the melt pool length is below a selected or certain threshold value. In an example rendering, a particular pixel of the overall displayed image could be shaded a particular first color (such as a green color) if both conditions are met, and shaded a second color (such as red) if only the first condition is met, and shaded a third color (such as blue) if only the second condition is met. In such manner, multiple variables could be displayed or depicted in different colors as an overall image to the user on a display screen of the user device for analysis. In some embodiments, the user may be permitted to formulate a query by selecting, for example, one or more sensor values along with one or more acceptable ranges. This would enable an operator or engineer or user to see only in-range and out-of-range information as an image on the display screen, or the user could choose to see the entire continuous spectrum of values for one or more selected sensors. The operator or engineer or user therefore has the ability to compare sensor data utilizing Boolean operators and map the results to the X-Y-Z coordinates of the object, and in some embodiments overlay a computer-aided design (CAD) file onto this data. It should be understood that such an image may depict a portion of a work piece, or a portion of the AM apparatus itself, and may be presented or provided during a AM fabrication process or at some time after the work piece has been fabricated. Accordingly, in some embodiments, in response to one or more queries, the user device renders or displays 208 a visual depiction of the desired portion of the work piece and/or a desired portion of the AM apparatus on a display screen.

For example, the visual depiction on the display screen may represent or be of a particular layer or layers of a work piece associated with a portion of the work piece that has been defective in past fabrication attempts, to allow the user or operator or engineer to visually inspection that particular layer or layers for any clues as to why defects occur in that area. In addition, the user device may be configured for filtering the visual depiction of one or more portions of the work piece on the display screen in three dimensions. For example, the software program may permit the user to rotate a displayed image and/or slice the displayed image to obtain further visual information. In another example, the user may be provided with a slide bar that permits the user to filter data corresponding to a parameter of interest such as melt pool size. For example, in some embodiments the user may be permitted to formulate a query requesting a work piece image as a geometry plot that renders points in the geometry only if the sensed data at a particular point is below some value N, and/or above some other value M.

Figure 3:
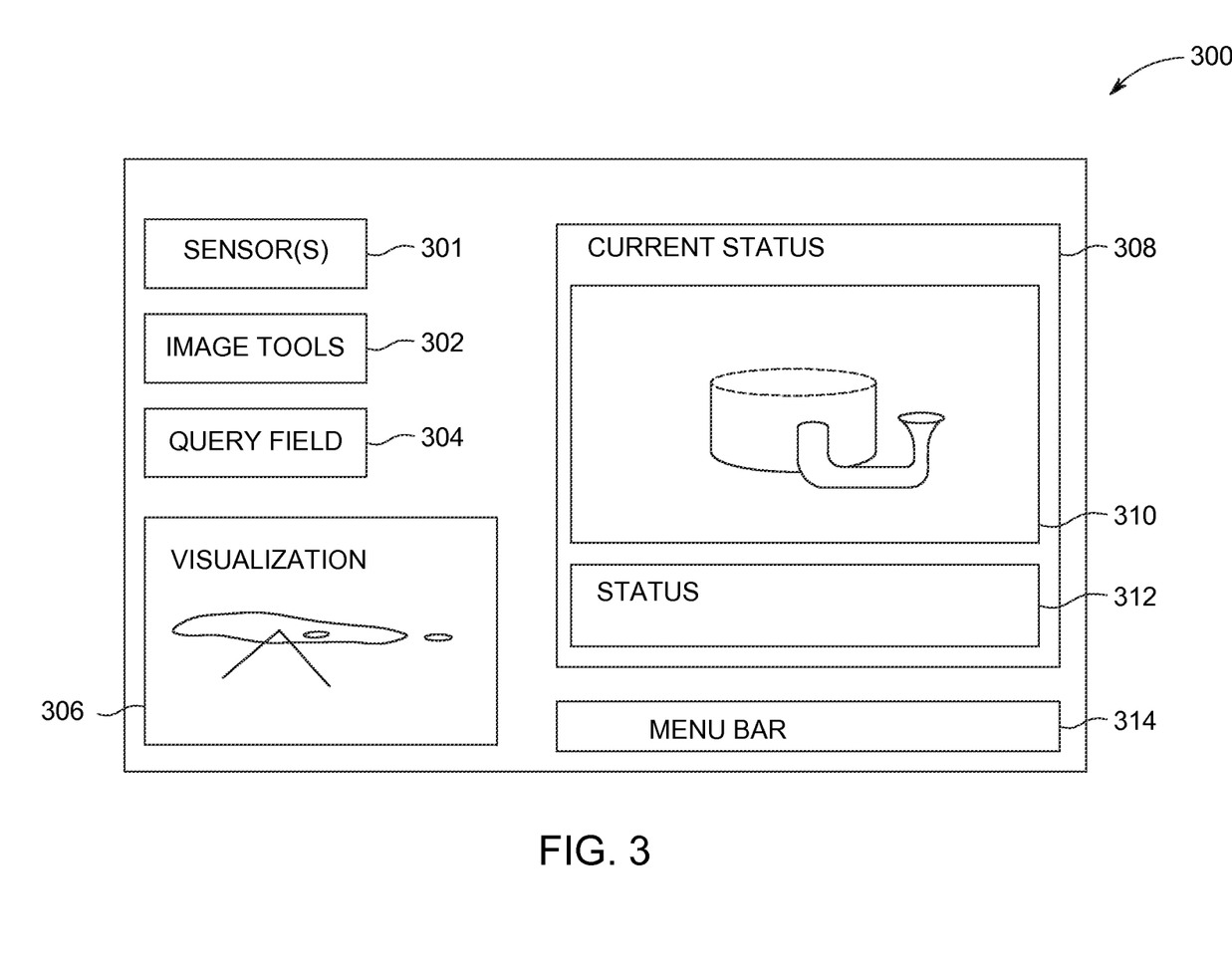
FIG. 3 depicts a user interface for displaying a visual depiction to a user, based on a user query, of a selected portion of a work piece associated with an AM process in accordance with some embodiments.

FIG. 3 depicts a user interface 300 according to some embodiments for displaying a visual depiction to a user, based on a user query, of a selected portion of a work piece or object associated with an AM process. In particular, the user interface 300 may be a web page or other remotely created and executed interface supported, for example, by a web server. In some embodiments, the user interface 300 may be served by an AM apparatus, such as the AM apparatus 102 described above, which may execute a web server via the internet or other network for remote access to sensor data concerning fabrication of a work piece. In yet another embodiment, the user interface 300 may be generated by a local application running on, for example a user device 132 such as a tablet computer, that may retrieve sensor data, image information, AM apparatus model data, and the like, from a variety of remote applications and other resources, while also formatting outbound commands from the user device to the various resources so that the process data can be transformed for use by one or more applications or programs running on the user device. The user interface 300 may in general be rendered on a display or similar hardware of the user device, and may permit user interaction through any suitable controls to permit a user to formulate Boolean queries, for example, to obtain and/or transform process data from sensor resources into visual depictions concerning one or more characteristics of one or more selected portions of a work piece or object.

Referring again to FIG. 3, the user interface 300 may include a sensors display area 301, an image tools display area 302, a query field 304, a work piece visualization area 306, a current status display area 308 of an active AM fabrication process, which includes a work piece image area 310 that displays a visual representation of the current and/or ongoing work piece, a status area 312, and a menu bar 314. The sensor display area 301 may include information related to the types of sensors being utilized to monitor the work piece fabrication process and/or the AM apparatus, and/or the type or types of sensor data or process data available for selection by the user. The sensor display area 301 may be interactive, and thus may permit a user to sort through a plurality of sensors with regard to the fabrication process, search for particular types of sensor data, and the like. The sensor display area 301 may also or instead provide sensor status information, such as information about availability and the like. In one aspect where the user interface 300 is a web page for remote users to obtain sensor data and request display of one or more portions of a work piece, the sensor display area 301 may be configured to receive a manual selection of one or more types of sensor data and the like. The image tools area 302 may include a variety of interactive features such as search capabilities for AM apparatus models and characteristics, and links to information about work piece models such as cost, user reviews, complexity and print time, model renderings, descriptions, materials for use in fabrication, notes from one or more content providers, and so forth. A query field 304 may be utilized by an operator or user or engineer to formulate Boolean queries associated with one or more portions of a work piece or object that will be displayed in a display area 306. For example, a user may select one or more sensor data input streams and request display of a particular portion or layer of a work piece (which may include multiple objects) which may include one or more ranges regarding, for example, temperature of a melt pool for depiction on the display screen in multiple colors. In another example, an AM operator may select multiple items listed in the image tools display area 302 to obtain a visual image of certain selected characteristics of the AM apparatus (by using, for example, a conventional control key and mouse click, or any other suitable user interface controls and/or techniques).

The user interface 300 may also include a current status display area 308 that displays information for a currently active work piece fabrication process. This area may include any information related to the fabrication process such as status, time to completion, source, current time, and the like. Additionally, this area may include a control or group of controls for manual operation of the AM apparatus of by a remote user. For example, it may be possible for a user to remotely stop fabrication, modify the fabrication process, restart fabrication, cancel fabrication, change fabrication settings, perform a test, and the like.

The current image status display area 308 may include an image area 310 that displays a visual representation of the current status of a work piece being fabricated. For example, the image area 310 may also or instead show a simulated work piece, such as a rendering of a three-dimensional model depicting a current state of the completion of the work piece. The visualization area 310 may also or instead show an image of a working volume of the AM apparatus or other fabrication resource captured during execution of the manufacturing process. This may, for example, include a digital still image (which may be updated periodically) or a video image captured from one or more video cameras positioned at the AM apparatus. In another example, the image area 310 may display a current tool path of the AM apparatus that is executing a fabrication process, such as a two-dimensional layer of the work piece showing a path of a nozzle as it traverses a current fabrication layer, and in some implementations the operator has the option to change the image shown on the display to another image and/or image angle or perspective and/or multiple images (for example, from the perspectives of a plurality of video cameras). A status area 312 may also be provided that shows current status information (for example, percentage completion, time until start, time until completion, and so forth) for the active resource. Thus, a user or operator may visually monitor progress or status of a remote fabrication job through the user interface 300.

The user interface 300 may also include a menu bar 316 or the like for other functions not otherwise accounted for within the other active areas. For example, the menu bar 316 may include links for file information, search tools, help menus, and/or user account information. This may include controls to share information about a particular fabrication job. For example, the user interface 300 may include at least one control to capture a frame of data from the video camera as a video image and to transmit that video image to a remote location through a data network. The remote location may, for example, be a co-worker's workstation or the like. In another aspect, the user device may be configured to transmit the video image in an electronic mail communication to, for example, one or more recipients identified by the user. In another aspect, the user interface 300 may include controls to capture a stop-motion animation of a portion of the fabrication process of the work piece using the video camera. Such user controls my include controls for a frame rate, duration, or other parameters of the stop-motion animation so that an animation of desired length and detail can be created for sharing or other use.

A technical effect of the described systems, apparatus and methods is to advantageously provide a user with visual information helpful in understanding the geometry of a work piece with regard in the context of an additive layer manufacturing (AM) process and/or AM apparatus behavior. In particular, in some embodiments sensor data collected during the manufacture of a object or work piece by an additive layer manufacturing (AM) process is transformed into a virtual representation (numeric model) of the work piece that can be viewed or inspected by a user to understand potential defects in the individual work piece, and/or potential defects relative to the individual AM machine making the object, and/or potential defects relative to the AM process employed by the AM machine, and/or potential defects relative to the AM process employed by the AM machine in the context of features of the work piece that is being built. Accordingly, a technical effect is that the user can, based on the understanding gleaned from observing potential or actual work piece defects, modify or alter the AM process for that particular work piece to decrease any defects and/or improve work piece yield. For example, based on visual image data viewed by the user, the user may modify one or more AM apparatus control commands and then initiate a second fabrication attempt of the same work piece design. For example, control commands for the AM apparatus may be implemented that change the orientation of the work piece on the melt pool, or that modify or scale a "requested laser intensity" during fabrication relative to one or more portions of the work piece, to thus optimize the process parameters in order to minimize or prevent work piece defects.

It should be understood that the flow charts and/or descriptions of the processes disclosed herein do not necessarily prescribe a fixed order of performing the method steps described. Rather, the method steps may be performed in any order that is practicable, including combining one or more steps into a combined step. In addition, in some implementations one or more method steps may be omitted. It should also be noted that any of the methods described herein may be performed by hardware, software, or any combination of these approaches. For example, a non-transitory computer readable storage medium or storage device may store thereon instructions that when executed by a machine result in performance according to any of the embodiments described herein. Such a non-transitory storage device may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "computer readable medium", "memory", "storage", or "storage medium". For example, a non-transitory storage device may store one or more programs for controlling one or more processors of the user device 132, which programs include program instructions that contain processor-executable process steps for displaying, for example, one or more images of an additive manufacturing process, including, in some cases, process steps that constitute processes provided in accordance with principles of the processes presented herein.

It is also to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention. In addition, although a number of "assumptions" are provided herein, the assumptions are provided as illustrative but not limiting examples of one or more particular embodiments, and those skilled in the art appreciate that other embodiments may have different rules or assumptions.

What is claimed is:

1. A visualization method comprising:
receiving, by a user device, process data associated with a three dimensional manufacturing process of an object, wherein the process data is obtained from at least one sensor monitoring features related to at least one of the object, the three dimensional manufacturing process, and the three dimensional manufacturing apparatus;
transforming, by the user device, the process data into visualization data compatible with a computer-aided design specification;
receiving, by the user device, a Boolean query associated with at least one aspect of at least one of the three dimensional manufacturing process, a portion of the object, and a three dimensional manufacturing apparatus; and
rendering, by the user device in response to the Boolean query, a visual depiction of the at least one aspect on a display screen, further comprising:
formulating the Boolean query, with the user device, by selecting one or more sensor values and one or more acceptable ranges.

2. The method of claim 1, wherein the received process data comprises data indicative of the three dimensional manufacturing apparatus.

3. The method of claim 2, wherein the three dimensional manufacturing apparatus data comprises at least one of laser power, laser drive current, laser scan speed, x-y-z coordinates, laser scatter off a galvanometer window, extrusion temperature, vibration data, re-coater vibration, machining tool vibration, feed speed, wire delivery speed, powder delivery speed, build chamber temperature, gas flow, oxygen concentration, spindle speed, accelerometer data, and curing lamp intensity.

4. The method of claim 1, wherein the received process data comprises data indicative of macroscopic object data.

5. The method of claim 4, wherein the macroscopic object data comprises at least one of camera images of the object being built, thermal images of the object, images of the powder bed layer, images of the post-weld layer, and spatter quantification data.

6. The method of claim 1, wherein the received process data comprises data indicative of microscopic object data.

7. The method of claim 6, wherein the microscopic object data comprises at least one of bead quality, melt pool size, melt pool shape, melt pool temperature, melt pool image, melt pool emission intensity, thermal melt pool data, and thermal melt pool images.

8. The method of claim 1, wherein the process data is observation data obtained from an operator of the three dimensional manufacturing apparatus.

9. The method of claim 1, wherein the three dimensional manufacturing process comprises one of a machining process, a powder fed additive process, or a powder bed additive process.

10. The method of claim 1, wherein the user device comprises one of a laptop computer, a tablet computer, a laptop computer, a thin client network computer, a portable digital assistant (PDA), a messaging device, a cellular telephone, a Smartphone, and a portable media or entertainment device.

11. The method of claim 1, wherein the three dimensional manufacturing process comprises an additive manufacturing (AM) process.

12. The method of claim 1, wherein transforming comprises normalizing three-dimensional coordinate data for compatibility with a computer-aided design (CAD) software program.

13. The method of claim 1, further comprising:
receiving, by the user device, image manipulation instructions; and
filtering, by the user device, the visual depiction of a portion of the object being manufactured in accordance with the image manipulation instructions.

14. The method of claim 13, wherein the image manipulation instructions include at least one of rotating or slicing the visual depiction of the portion of the object being manufactured.

15. The method of claim 1, further comprising:
displaying, on the user device, results of the Boolean query according to conditions of the Boolean query being met.

16. The method of claim 15, wherein the results of the Boolean query according to the conditions of the Boolean query being met are color coded.

17. A visualization method, comprising:
receiving, by a user device, process data associated with a three dimensional manufacturing process of an object;
transforming, by the user device, the process data into visualization data compatible with a computer-aided design specification
receiving, by the user device, a Boolean query associated with at least one aspect of at least one of the three dimensional manufacturing process, a portion of the object, and a three dimensional manufacturing apparatus; and
rendering, by the user device in response to the Boolean query, a visual depiction of the at least one aspect on a display screen, further comprising:
formulating the Boolean query, with the user device, by requesting the visual depiction as a geometry plot that renders points in the geometry plot only if values of the at least one aspect is below a first value and/or above a second value.

* * * * *